United States Patent [19]

Inoue

[11] Patent Number: 5,447,574
[45] Date of Patent: Sep. 5, 1995

[54] METHOD OF AUTOMATICALLY WASHING VEHICLES AND APPARATUS FOR THE SAME

[75] Inventor: Jun Inoue, Higashi-Osaka, Japan

[73] Assignee: Nippo Mfg. Co., Ltd., Higashi-Osaka, Japan

[21] Appl. No.: 240,471

[22] Filed: May 10, 1994

[30] Foreign Application Priority Data

May 10, 1993 [JP] Japan .................................. 5-108593

[51] Int. Cl.⁶ .................................................. B08B 3/02
[52] U.S. Cl. ................................... 134/18; 134/56 R; 134/57 R; 134/123; 134/181; 134/172
[58] Field of Search ........................ 134/57 R, 56 R, 45, 134/123, 18, 24, 181, 172; 118/669, 676, 682; 15/DIG. 2

[56] References Cited

U.S. PATENT DOCUMENTS

| | | | |
|---|---|---|---|
| 3,073,321 | 1/1963 | Lukas | 134/123 |
| 3,288,109 | 11/1966 | Smith, Jr. et al. | 134/123 X |
| 3,989,003 | 11/1976 | Fagan et al. | 118/676 |
| 4,333,083 | 6/1982 | Aldridge . | |
| 4,562,848 | 1/1986 | Messing et al. | 134/123 |
| 4,856,543 | 8/1989 | Petit | 134/57 R |
| 4,946,513 | 8/1990 | Del Prato et al. | 134/57 R |

FOREIGN PATENT DOCUMENTS

| | | |
|---|---|---|
| 1-178051 | 7/1989 | Japan . |
| 1-178053 | 7/1989 | Japan . |
| 3-220050 | 9/1991 | Japan . |

*Primary Examiner*—Frankie L. Stinson
*Attorney, Agent, or Firm*—Oblon, Spivak, McClelland, Maier & Neustadt

[57] ABSTRACT

While a portal frame is reciprocated longitudinally of a vehicle body to be washed, a lifting/lowering drum is lifted/lowered to allow an upper nozzle to follow the outer surface of the vehicle body with a predetermined distance and the upper nozzle is laterally moved to inject a washing liquid therefrom, side nozzles are lifted/lowered to inject a washing liquid on the side surfaces of the vehicle body therefrom. In the first going operation of the portal frame, a plurality of photo-sensors disposed vertically which are provided on the front portion of the portal frame detects the vehicle body and information from the photo-sensors is stored in time sequence to perform a comparative operation with the previously set information, thereby controlling the movement of the portal frame, lifting/lowering of the lifting/lowering drum, the lateral movement of the upper nozzle and lifting/lowering of the side nozzles according to each portion of the vehicle body.

13 Claims, 15 Drawing Sheets

METHOD OF AUTOMATICALLY WASHING VEHICLES AND APPARATUS FOR THE SAME

FIELD OF THE INVENTION AND RELATED STATEMENT

The present invention relates to a method of automatically washing vehicles wherein a vehicle body is washed without a brush, and an apparatus for the same.

There have been known techniques of washing a vehicle body using water jetted on the vehicle body in place of a rotary brush, for example, those disclosed in Unexamined Japanese Patent Publication Nos. HEI 1-178051 and HEI 3-220050.

This related technique includes the steps of reciprocating a portal frame in front of and behind a vehicle body to be washed and simultaneously lifting/lowering a lifting/lowering drum disposed on the upper portion of the portal frame for allowing an upper nozzle provided on the lifting/lowering drum to follow the outer surface of the vehicle body to be separated from the vehicle body with a specified interval, moving the upper nozzle laterally and jetting washing liquid composed of water, detergent, wax or the combination thereof from the upper nozzle; meanwhile, lifting/lowering side nozzles disposed on the right and left side portions of the portal frame, and jetting washing liquid on the side surfaces of the vehicle body from the side nozzles. The above vehicle washing steps include scattering of detergent, water washing (containing wax), water washing, drying and the like. Various courses are set by the combination of these steps, and the portal frame is reciprocated one time for the short course, and is reciprocated two times for the long course.

In the vehicle washing actions in each course, the outer surface of a vehicle body is detected by sensors for controlling the orientation of each nozzle, so that the upper nozzle, the side nozzles and the like are usually disposed at the optimal positions with respect to the vehicle body for effectively performing the work.

As the above sensor, in place of a contact type which has the fear of damaging a vehicle body, a non-contact type such as a photo-sensor is adopted. The detection signal from the photo-sensor is delayed for a specified time, and a control command is transmitted to a drive system including the upper nozzle, side nozzles and the like. Moreover, the detection for the vehicle body is made for each going or returning operation of the portal frame.

The lateral movement distance of the upper nozzle provided on the lifting/lowering drum is usually constant; accordingly, in an automatic vehicle washing apparatus for an automobile, the movement distance is set to correspond to a large-sized vehicle, and also to be applicable for a light four-wheel vehicle.

The upper nozzle has two types in terms of the jetting fixture: one type has one jetting fixture usually taken in a downward posture; and the other type has three jetting fixtures taken in a downward posture, a forwardly and downwardly inclined posture, and a rearwardly and downwardly posture, which are selectively used one after another. Water used in the upper nozzle and the side nozzles is supplied from a water tank disposed outside the portal frame by way of a water jetting hose and a high pressure hose. Moreover, the maintenance for the equipments disposed within the right and left side portions of the portal frame is carried out through doors provided on the outer surfaces of the side portions.

In the above-described related technique, since the portal frame is required to detect a vehicle body at the time of the going and returning operations, it must be provided with the sensors used for each of the going and returning operations; and further, since the sensors are separated from the nozzles, it is difficult to accurately detect a vehicle body. Moreover, in the case that the sensors for detecting a vehicle body are broken down, the detection for a vehicle body becomes impossible, which causes the fear that the lifting/lowering drum or moving base collides with the vehicle body. The side nozzles are lifted/lowered usually at a constant speed; accordingly, when the height of the portion of a vehicle body to be washed is high and the moving stroke is long, there is generated the portion in which the supply of a washing liquid is insufficient, resulting in the nonuniformity of the washing.

The lateral moving distance of the upper nozzle is made usually constant, and accordingly, in the case of washing for a small-sized vehicle such as a light four-wheel vehicle, there occurs the waste of washing liquid and each action. Moreover, one upper nozzle directed downwardly makes it difficult to jet water on the inclined portion of a vehicle body with the optimal angle; and three of the upper nozzles complicate the structure and cause an inconvenience that there remains a portion in which the washing liquid is not supplied upon switching thereof.

Additionally, water is easily supplied to the water tank; however, since it must be supplied to the portal frame by way of the high pressure hose, there occurs leakage of water, reduction in pressure and the like, which makes it difficult to optimally supply water to the nozzles, so that it is required to ensure a space where the water tank is disposed outside the portal frame. Moreover, spaces where the doors are opened/closed and a person goes in and out is required to be provided outside the right and left side portions of the portal frame, which excessively increases the whole installation area necessary for the automatic vehicle washing apparatus.

OBJECT AND SUMMARY OF THE INVENTION

An important object of the present invention is to detect the information on a vehicle body in time sequence by means of a vehicle detecting means disposed on a portal frame to be extended long in the vertical direction, and recognize the vehicle-type of a vehicle body during only one reciprocation of the portal frame and hence to accurately move an upper nozzle, side nozzles and the like with respect to the vehicle body on the basis of the recognized vehicle-type in the midway or after the detection.

Another important object of the present invention is to lift/lower side nozzles according to the height of a portion of a vehicle body to be washed, that is, lift/lower the side nozzles at a high speed when the portion to be washed is high, and lift/lower the side nozzles when the portion is low, and hence to eliminate the nonuniformity of washing by changing the lifting/lowering speed of the side nozzles even when the height of the portion of the vehicle body to be washed is changed and the lifting/lowering stroke is varied.

A further important object of the present invention is to dispose a vehicle detecting means composed of photo-sensors arranged long in the vertical direction on a portal frame for detecting the information on the vehicle body in time sequence, and recognize the vehicle-type during only one reciprocation of the portal frame, and hence to accurately move an upper nozzle, side nozzles and the like with respect to the vehicle body on the basis of the recognized vehicle-type in the midway or after the detection.

A specific object of the present invention is to provide a collision preventive means on a moving base for avoiding the collision of a lifting/lowering drum, the moving base, an upper nozzle and the like with the vehicle body by detecting the vehicle body even when a vehicle detecting means is broken out for any reason or part of the vehicle body is difficult to be detected.

Another specific object of the present invention is to set a plurality of the right and left moving distances of an upper nozzle to be selected, and hence to lower the waste of a washing agent and each action by changing the moving distance of the upper nozzle according to the magnitude of the width of the vehicle body.

A further specific object of the present invention is to continuously inject a washing liquid on each portion of a vehicle body with a suitable angle by rotating the main body of an upper nozzle having one injecting fixture around a lateral shaft for changing the posture of the upper nozzle using the injecting fixture.

Still a further specific object of the present invention is to dispose water tanks and water injecting pumps in both side portions of a portal frame and provide doors for maintenance within the side portions of the portal frame, and hence to reduce the whole installation area necessary for the apparatus and suppress the leakage of water, reduction in pressure and the like.

DETAILED DESCRIPTION OF THE PREFERRED EMBODIMENTS

Figure 1:
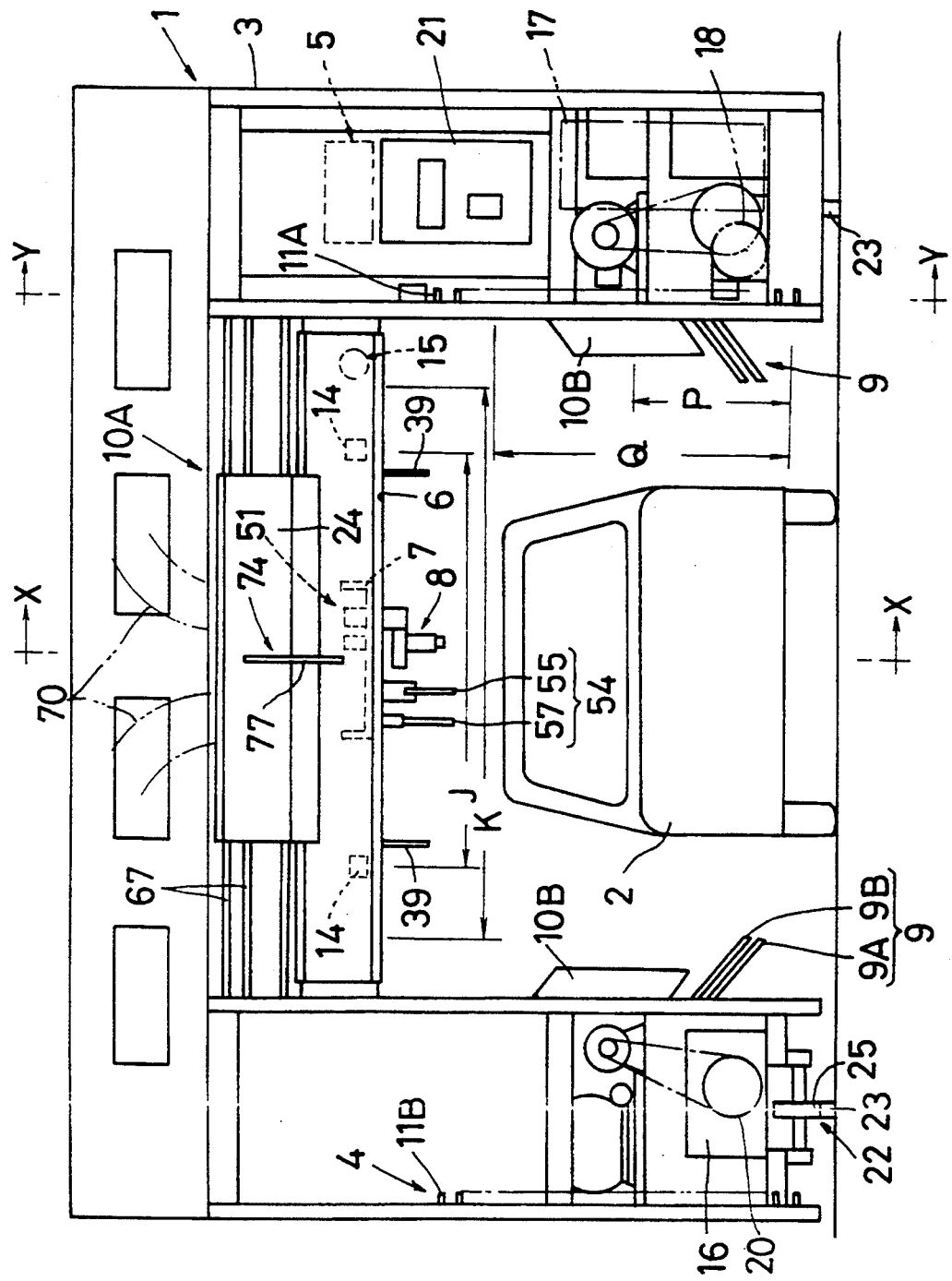
FIG. 1 is a front view showing an embodiment of the present invention.

Hereinafter, embodiments of the present invention will be described with reference to the drawings.

Referring to FIGS. 1 to 5, an automatic vehicle washing apparatus 1 has a portal frame 3 which is formed in a portal shape having both side portions and an upper portion connecting the above side portions to each other. The portal frame 3 is movable relative to a vehicle body 2 to be washed in such a manner as to be laid across and cover the vehicle body 2, and which mounts all of equipments necessary for vehicle washing. The portal frame 3 is capable of running along rails 23 at a specified speed by drive of wheels 25 using running mechanisms 22 provided on the bottoms of both side portions. The portal frame 3 is provided with a vehicle detecting means 4 for detecting the outer surface of the vehicle body 2, a lifting/lowering drum 6 liftably provided, a moving base 7 provided on the lifting/lowering drum 6 so as to be laterally movable, an upper nozzle 8 for washing which is provided on the moving base 7, a pair of both side nozzles 9 for washing which are liftably provided on the both side portions of the portal frame 3, various drive equipments, tanks and the like. Moreover, an operating panel 21 is provided on one front side surface of the portal frame 3. The vehicle detecting means 4 has a plurality of photo-sensors 11 which are vertically arranged. The photo-sensors 11 are so constructed that light emitting devices 11A are provided on one of both side portions of the portal frame 3 and light receiving devices 11B are provided on the other side portion of the portal frame 3 for detecting the presence of the vehicle body 2 using the linearity of light.

Figure 6:
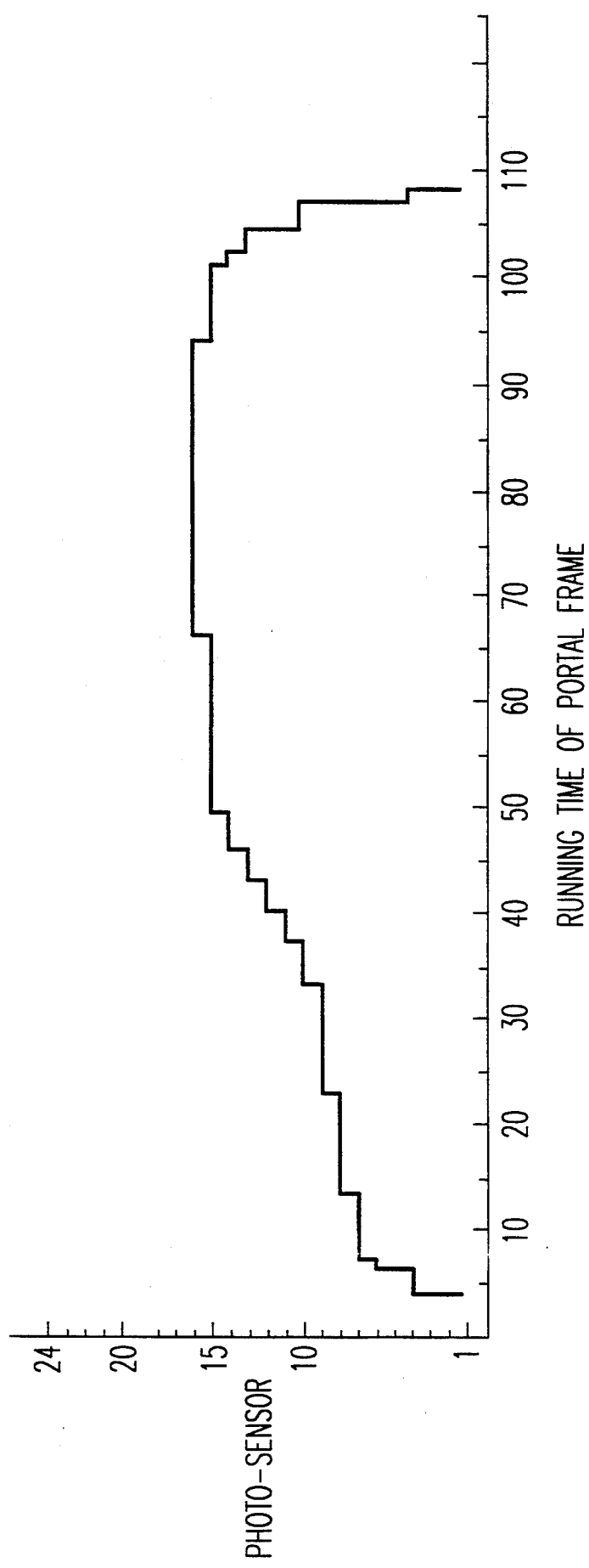
FIG. 6 is a view for explaining an example of reading-out of the vehicle-type for a passenger car.
Figure 7:
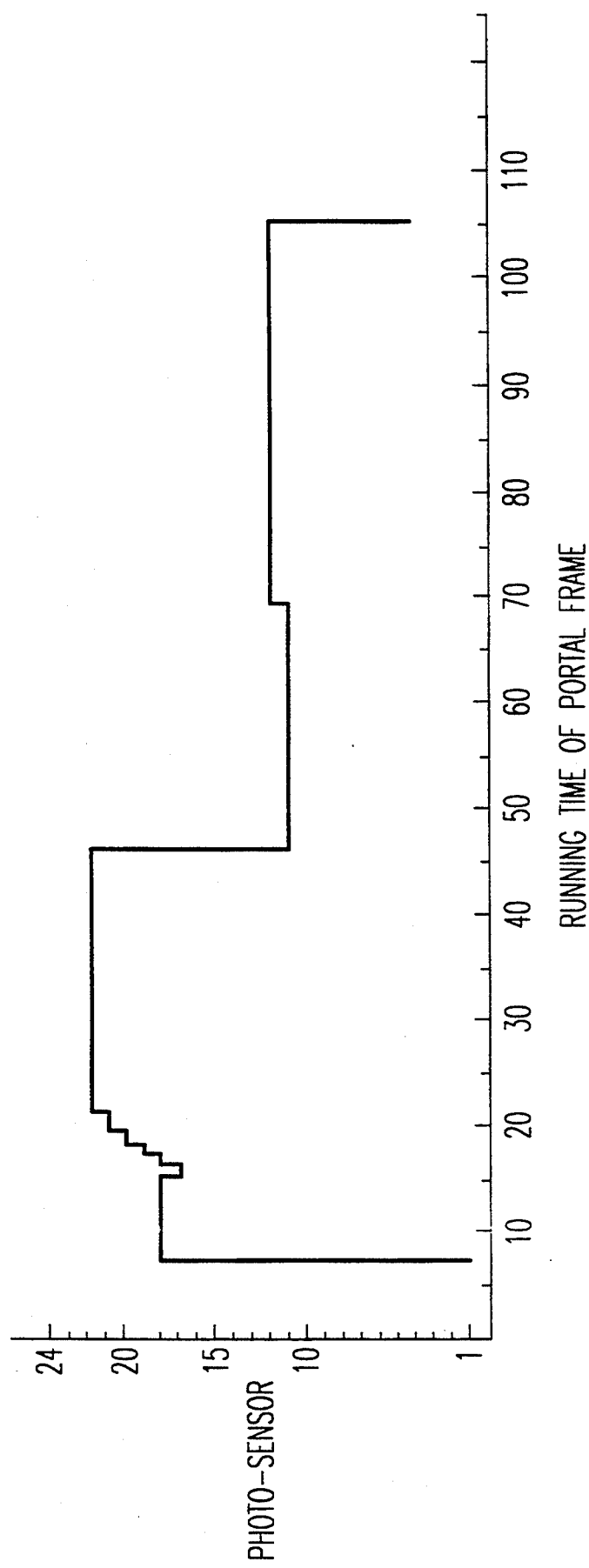
FIG. 7 is a view for explaining an example of reading-out of the vehicle-type for a truck.

In FIG. 1 and FIGS. 6 to 8, as for the photo-sensors 11, 24 pieces of the light emitting devices 11A are vertically arranged, and the light receiving devices 11B are changed from the on-state to the off-state when the lights from the light emitting devices 11A are shielded by the vehicle body 2. In this case, the boundary between the on-state and off-state of the photo-sensors 11 vertically provided corresponds to the height of the upper surface of the vehicle body 2. Moreover, along with the running of the portal frame 3 to the vehicle body 2, one of the light receiving devices 11B is changed with time from the on-state to the off-state. Thus, the time sequential change in the boundary between the on-state and the off-state of the photo-sensors 11 corresponds to the front or reap surface of the vehicle body 2, and the vertical and time-sequential change in the boundary between the on-state and off-state of the photo-sensors 11 corresponds to the inclined surface of vehicle body. FIG. 6 shows an example of reading-out the vehicle-type for a passenger car; and FIG. 7 shows an example of reading-out of the vehicle-type for a truck.

The information from the photo-sensors 11 is stored in a memory unit A of a computer 30 in time sequence. The computer 30 has a set information unit B in which the set information on vehicle washing is programmed, a processing unit C for reading-out the information from the memory unit A on the basis of the set information programmed in the set information unit B and supplying a control signal to each equipment of the automatic vehicle washing apparatus 1, and an error memory unit L. These units A, B and C constitute a vehicle-type recognizing means 5. Additionally, the memory in the memory unit A is reset by pushing of a start button.

As shown in FIGS. 1 to 5 and FIGS. 9 and 10, the lifting/lowering drum 6 is formed in a square box shape, which is connected at the right and left end portions to chains 32 of drum lifting/lowering mechanisms 31 disposed within both side portions of the portal frame 3, and which is lifted/lowered by drive of motors 33. Numerals 34U and 34D indicate upper and lower sensors for setting the lifting/lowering range of the lifting/lowering drum 6.

The moving base 7 is provided within the lifting/lowering drum 6 in such a manner as to be movable laterally (widthwise to the vehicle body 2) through guide rails 35. Numeral 36 indicates a timing belt connected to the moving base 7, which is wound around a pulley and intended to be driven by a motor 37 or the like. A pair of right and left sensors 14, which are provided within the lifting/lowering drum 6, are operated to reverse the rotation of the motor 37 directly or after an elapse of a specified time since the operation of the sensors 14. The above timing belt 36, sensors 14 and the motor 37 constitute a drive mechanism 15 for smoothly reciprocating the moving base 7 at a high speed.

In the above moving base drive mechanism 15, when the motor 37 is reversed directly after the operation of the sensors 14, the moving range of the moving base 7, that is, the moving distance of the upper nozzle 8 becomes a range J shown in FIG. 1; meanwhile, when the motor 37 is reversed after an elapse of a specified time since the operation of the sensors 14 by way of a timer or a delay circuit, the moving distance of the upper nozzle 8 becomes a range L longer than the above range J by a specified value. Thus, for the upper nozzle 8, two types of the moving distances can be set to correspond to the widths of the two types of vehicular bodies 2.

The selection of the moving range of the moving base 7 by the moving base drive mechanism 15 may be manually inputted in the set information unit B at the time of setting the vehicle washing course. However, as shown in FIG. 1, it is desirable that a pair of right and left contact or non-contact type body width sensors 39 are provided on the front portion of the lower surface of the lifting/lowering drum 6, whereby the body width is automatically detected and the detection signal is inputted into the set information unit B, and when the vehicle width is more than a specified value, the moving base is set to be reciprocated within the range K. In addition, by provision of a plurality of pairs of right and left sensors 14 and 39, three or more kinds of the moving distances can be set for the upper nozzle 8.

In the moving base 7, a motor 41 and a supporting case 42 are fixed on a supporting base 40, and the lower portion of the supporting case 42 passes through a groove 38 formed on the lifting/lowering drum 6 and projects downwardly for rotatably supporting the upper nozzle 8.

Figure 11:
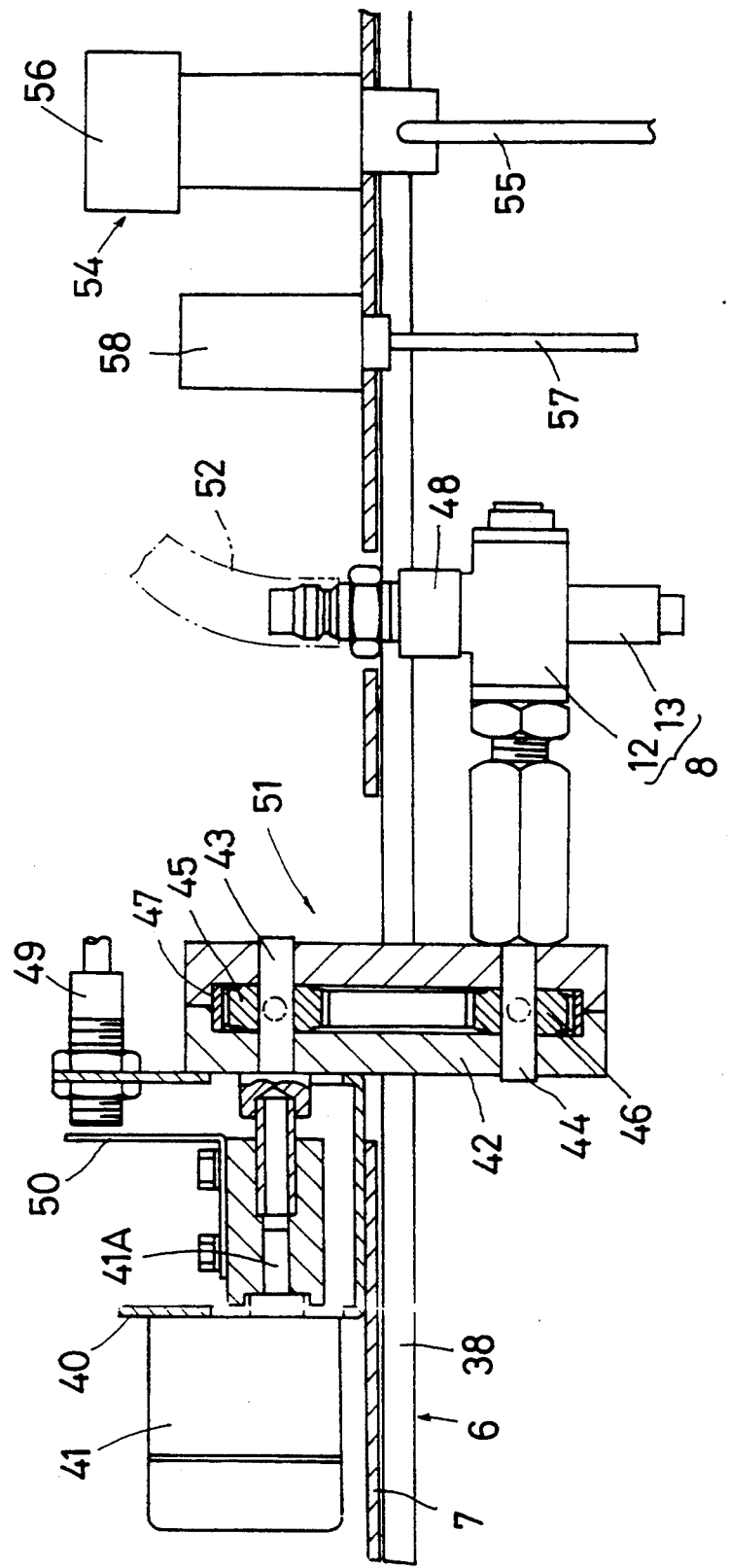
FIG. 11 is a sectional front view showing a nozzle posture changing mechanism and a drum collision preventive means.
Figure 12:
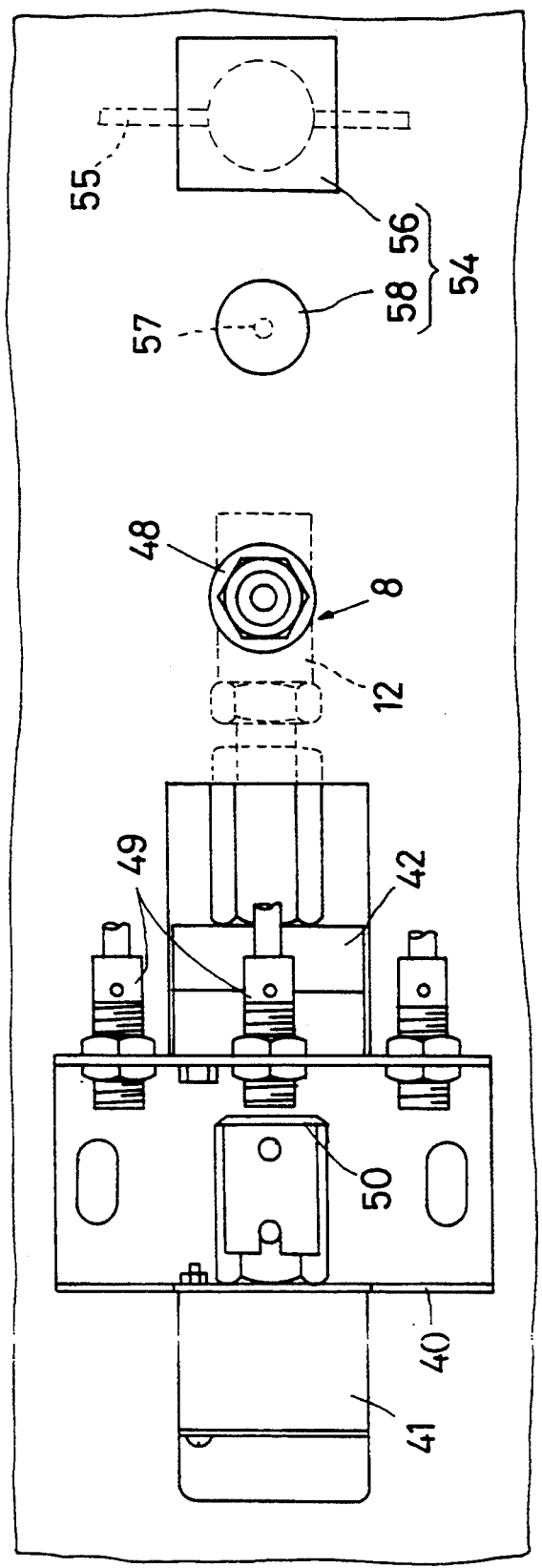
FIG. 12 is a plan view of FIG. 11.

In FIGS. 11 and 12, upper and lower shafts 43 and 44 are supported on the supporting case 42, and a timing belt 47 is wound around gears 45 and 46 respectively fixed on the shafts 43 and 44. The upper shaft 43 is directly connected to an output shaft 41A of the motor 41, and a main body 12 of the upper nozzle 8 is fixed on the lower shaft 44. Accordingly, when the motor 41 is driven, the upper shaft 43 is rotated and the upper nozzle 8 is rotated about the lateral shaft through the timing belt 47 and the lower shaft 44.

The upper nozzle 8 has one injecting fixture 13 projecting downwardly from the lateral main body 12, and a hose connection fixture 48 positioned in the diameter direction of the injecting fixture 13. The injecting fixture 13, while being not fully shown in the figure, can be changed in its injecting manner between the state of spraying a detergent and the state of injecting water in a spatulate shape.

Three proximity switches 49 are provided on the supporting base 40, which is operable by an operating piece 50 provided on the output shaft 41A. The proximity switches 49 are intended to control the motor 41 for stopping the upper nozzle 8 at three turning positions.

Figure 2:
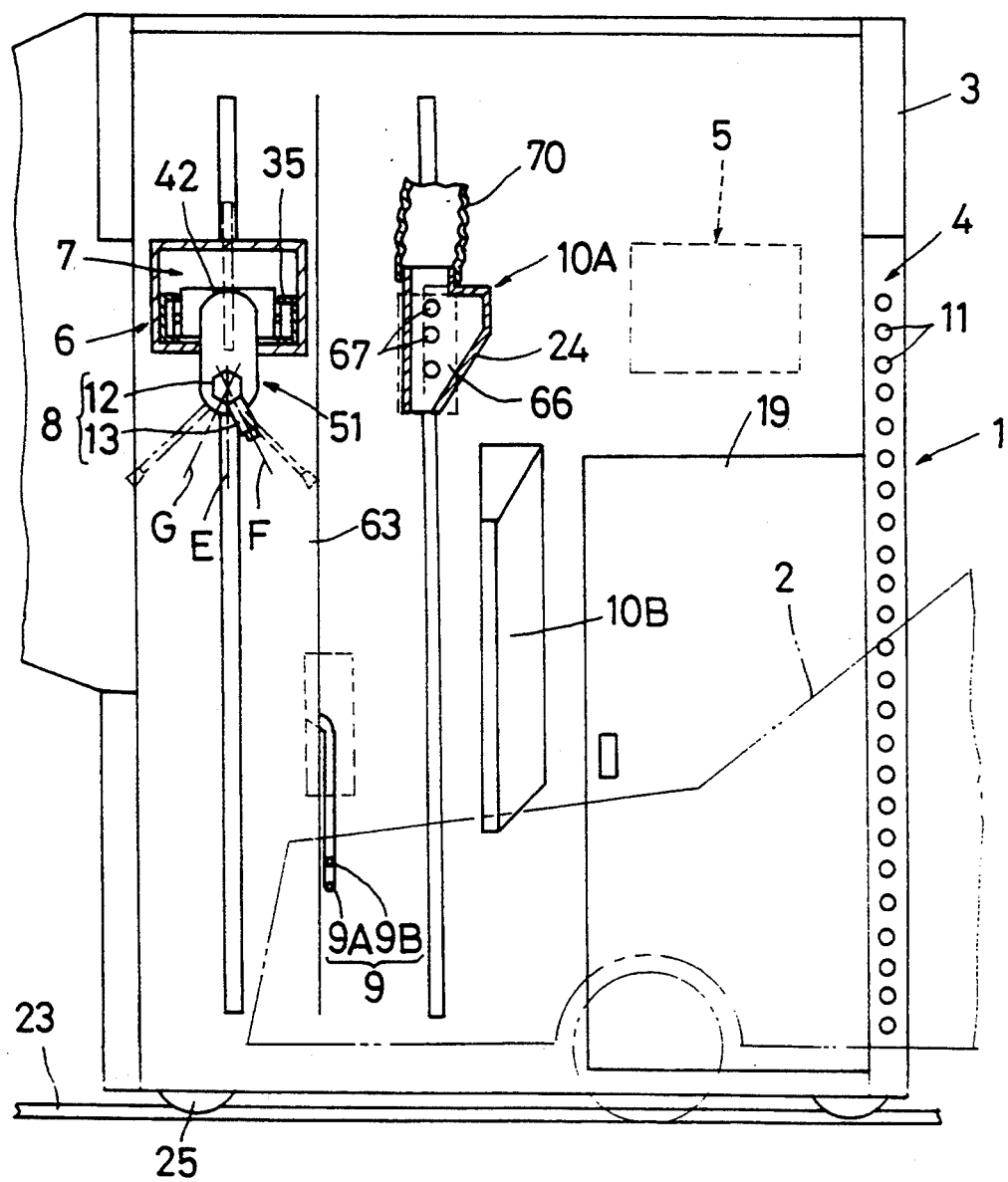
FIG. 2 is a sectional view taken along the line X—X of FIG. 1.

Namely, by rotation of the upper nozzle 8, as shown in FIG. 2, the injecting fixture 13 can be changed in its posture among a downward posture E, a forwardly and downwardly inclined posture F, and a rearwardly and downwardly inclined posture G. These postures E, F and G are set by the proximity switches 49. Thus, the proximity switches 49, the motor 41 and a transmitting means within the supporting case 42 constitute a nozzle posture changing mechanism 51 for changing the posture of the upper nozzle 8.

The above nozzle posture changing mechanism 51 is operated on the basis of a command signal from the vehicle-type recognizing means 5, which changes the posture of the upper nozzles 8 into the downward posture E for the bon-net, roof and trunk lid of the vehicle body 2; into the forwardly and downwardly inclined posture F for the front surface and front glass of the vehicle body 2; and into the rearwardly and downwardly inclined posture G for the rear glass and rear surface of the vehicle body 2, so that the upper nozzle 8 injects a washing liquid to the surface of each portion to be washed at right angles or at about right angles, to make the washing effect as large as possible. Furthermore, even when being changed in the posture by rotating, the upper nozzle 8 continuously injects a washing liquid, to certainly supply the washing liquid to any portion to be washed.

The above nozzle posture changing mechanism 51 may be altered in design by changing the positions of the proximity switches 49 such that the upper nozzle 8 is rotatable before and after from the downward posture for each 90° to be thus changed in its posture between the forward horizontal posture and the rearward horizontal posture.

The hose connection fixture 48 is connected to an injecting pump by way of the hose 52, an electromagnetic switching valve and the like. The injecting pump is connected to the detergent tank 16, water tank 17, wax tank 53 and the like (see FIGS. 1 and 4) so that a washing liquid such as a detergent, water and water containing wax is suitable jetted from one upper nozzle 8.

A drum collision preventive means 54 is provided on the moving base 7. The drum collision preventive means 54 has a first sensor for detecting the longitudinal movement of a hair contact piece 55 projecting in front of and behind the groove 38, and a second sensor 58 for detecting the vertical movement of a hair contact piece 57 projecting downwardly from the groove 38.

When the upper nozzle 8 of the lifting/lowering drum 6 excessively approaches the vehicle body 2 in the longitudinal and vertical directions because of the failure of the vehicle-type recognizing means 5, the drum collision preventive means 54 is operated by the contact of the contact pieces 55 and 57 with the vehicle body 2, to output the detection signal to the computer 30. Namely, the first sensor 56 detects the excessive approach in the longitudinal direction, and the second sensor 58 detects the excessive approach in the vertical direction, to stop the lifting/lowering of the lifting/lowering drum 6 and the running of the portal frame 3.

Figure 8:
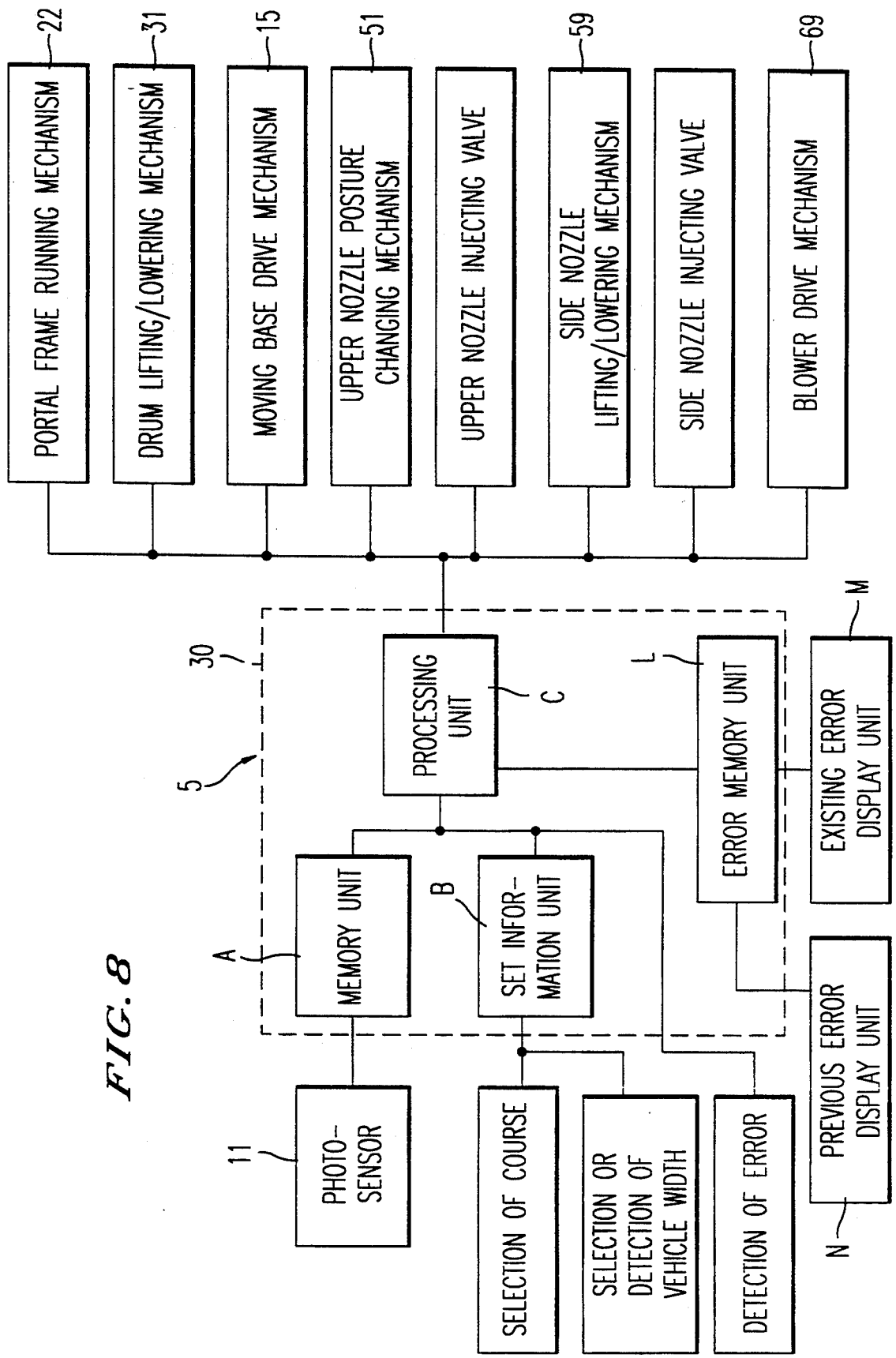
FIG. 8 is a view for explaining the control.
Figure 9:
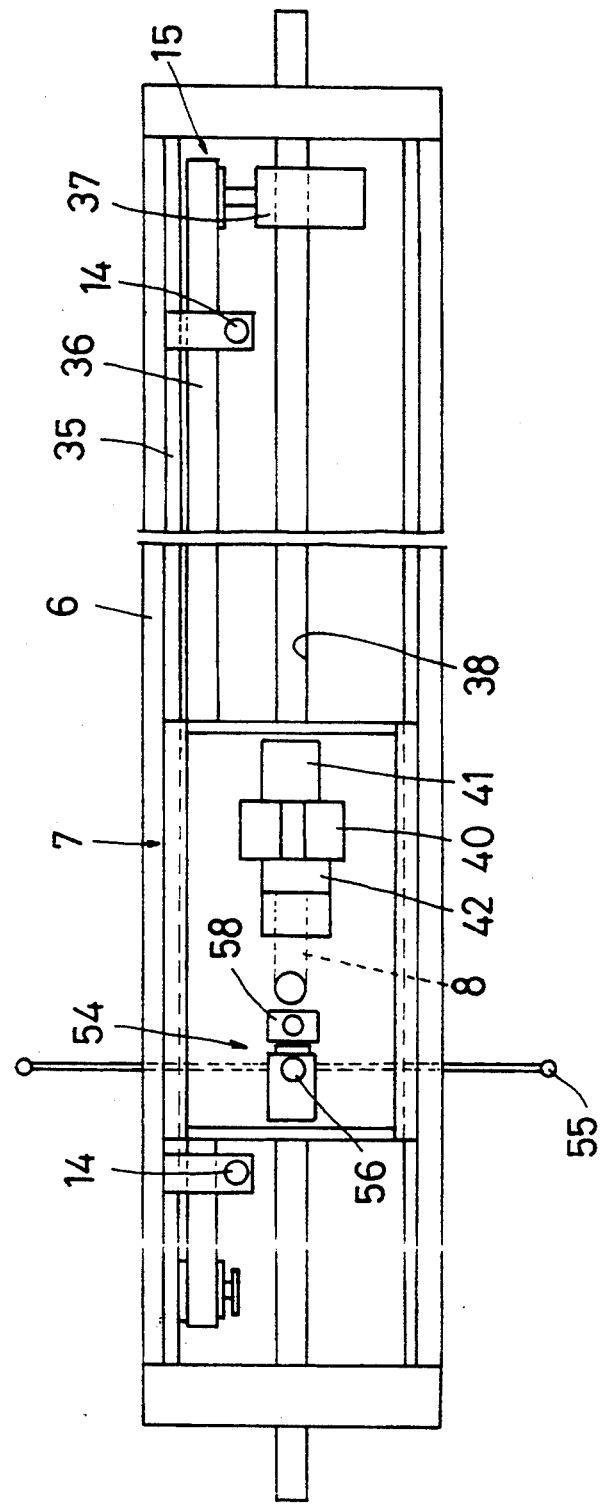
FIG. 9 is a plan view showing the structure of the interior of a lifting/lowering drum.
Figure 10:
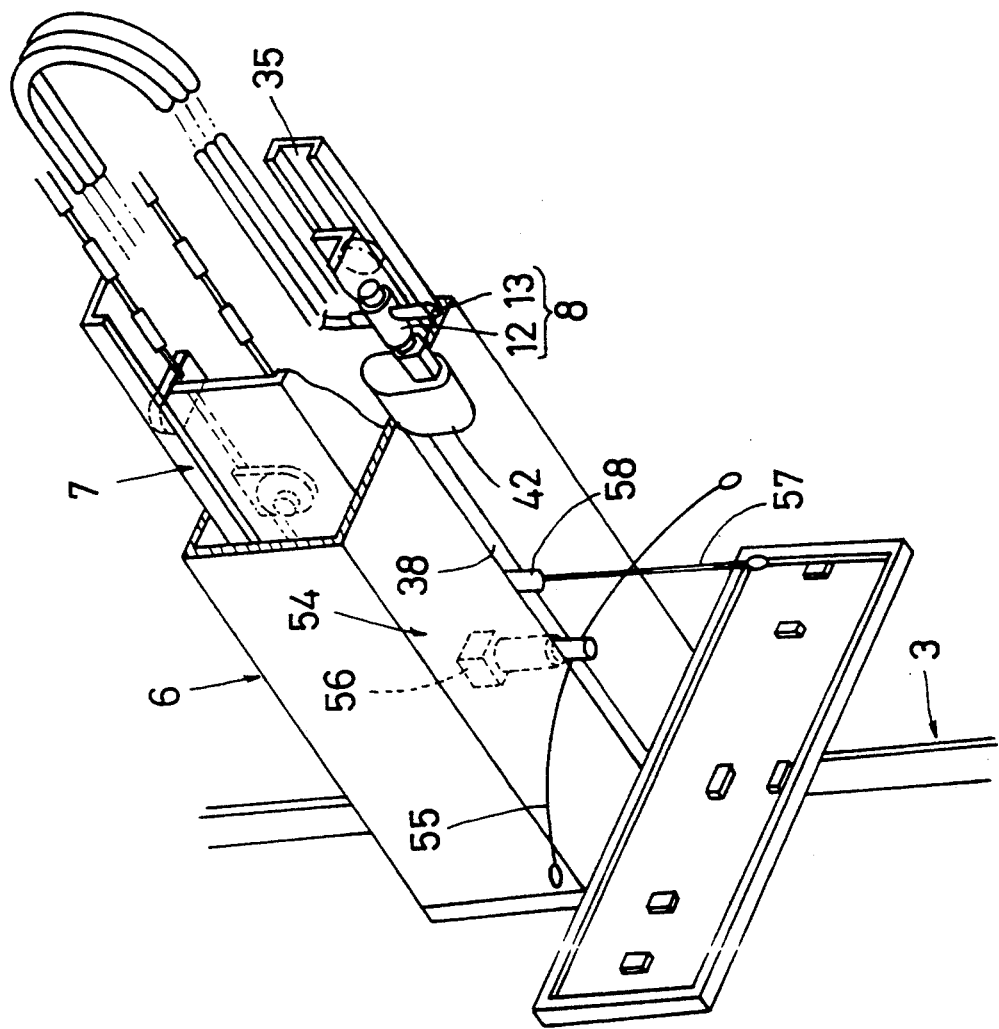
FIG. 10 is a perspective sectional view of a moving base and an upper nozzle.

Additionally, the contact piece 55 may be modified in design such that the central supporting portion thereof is supported ported by a spherical member, so that the longitudinal and lateral rocking motions of the contact piece 55 are detected by the first sensor 56. With this arrangement, the whole length and the whole width of the vehicle body 2 can be detected only by one sensor by the relative movement of the sensor to the vehicle body 2 in the longitudinal and lateral directions. It is considered to provide the first sensor 56 at the lateral center of the lifting/lowering drum 6; however, in this case, the first sensor 56 is difficult to detect the reap view mirror, roof rails and the like. Accordingly, the first sensor 56 is preferably provided on the moving base 7. The detected information from the drum collision preventive means as an error detecting means is transmitted to the processing unit C of the computer 30. As shown in FIG. 8, the detected information is stored in the error storing unit L, and is displayed on an existing error display unit M of the operating panel 21 as an error.

In FIGS. 1 to 5, each of both side nozzles 9 is divided into a detergent nozzle 9A and a water nozzle 9B. The nozzles 9A and 9B are connected to timing belts 60 of nozzle lifting/lowering mechanisms 59 within both side portions of the portal frame 3, and are lifted/lowered by drive of motors 61. Numeral 62U and 62D indicate upper and lower sensors for setting the maximum lifting/lowering range of the lifting/lowering drum 6. The side nozzle 9 is changed in its lifting/lowering stroke from a lifting height P to a lifting height Q according to the height of a portion of the vehicle body 2 to be washed on the basis of the command control by the vehicle-type recognizing means 5, and thereby supplies a washing liquid only to the portion required to be washed, thus eliminating the waste of the detergent and water.

The lifting/lowering speed of the side nozzle 9 of the nozzle lifting/lowering mechanism 59 is variable, and a time required for its reciprocating operation is set to be substantially constant even when the lifting height thereof is changed. Namely, in the case that the height of the upper surface of the vehicle body 2 to which the side nozzle 9 is opposed is low, for example, in the case of the height P, the lifting/lowering speed of the side nozzle 9 is slow. Meanwhile, in the case that it is high, for example, in the case of the height Q, the lifting/lowering speed of the side nozzle 9 is high. Accordingly, even in the case of the lifting height Q, the moving density of the side nozzle 9 in the longitudinal direction of the vehicle body 2 becomes dense, to make substantially constant the supply amount of the washing liquid over the whole length of the vehicle body 2 in the vertical direction, thereby eliminating the nonuniformity of the washing. In addition, the side nozzle 9, which is high in the lifting/lowering speed, is driven not by the chain, but by the timing belt to prevent the generation of noise.

A projecting groove 63 of the side nozzle 9 provided on the portal frame 3 is opened not inwardly but forwardly, and the side nozzle 9 is so constructed that the base portion is bent and the leading edge is directed inwardly, to preferably prevent the permeation of water from the projecting groove 83 into the portal frame 3. Each of the detergent nozzle 9A and the water nozzle 9B is connected to a injecting pump by way of a hose, electromagnetic switching valve and the like. Each injecting pump is connected to the detergent tank 16, water tank 17 and the wax tank 53 and the like, so that the detergent nozzle 9A jets only a detergent, and water nozzle 9B jets water or water containing wax.

The detergent injecting pumps 20, water injecting pumps 18, detergent tanks 16, water tanks 17 and wax tanks 53 for the upper nozzle 8 and side nozzles 9 are disposed in both side portions of the portal frame 3. The nozzles 8 and 9 are connected to the pumps 20 and 18 through high pressure hoses. The water tank 17 is connected to an external water line pipe by way of a hose. By arrangement of the water tanks 17 within the portal frame 3, it is possible to extremely shorten the distance between the water injecting pumps 18 and the upper nozzle 8 and the side nozzles 9, to obtain the desired water pressure with small pumps and motors just as in the detergent tanks and wax tanks, and to reduce the leakage of water.

As shown in Fig, 2, doors 19 for maintenance are provided within both side portions of the portal frame 3 for maintaining and checking the various injecting pumps, power distribution equipment and the like, and for supplying detergent and wax to various tanks. By the provision of the doors 19 within the right and left side portions of the portal frame 3, it is possible to eliminate the space around the portal frame 3 for entrance and exit through the doors 19, and hence to lower the whole installation space of the automatic vehicle washing apparatus 1.

In FIGS. 1 to 5, and FIG. 13, numeral 10 indicates a blower injecting means for drying the vehicle body 2, which has an upper blower injecting means 10A and a pair of right and left lateral blower injecting means 10B. A pair of lateral blower injecting means 10B are provided in both side portions of the portal frame 3, and wind jetting ports are directed inwardly, which are fixed in this embodiment; however they may be vertically moved.

The upper blower injecting means 10A is so constructed that a blower injecting body 24 having a pair of right and left wind injecting chambers 66 is connected to a lifting/lowering body 68 through supporting members 67 formed of a plurality of bar materials, and the lifting/lowering body 68 is intended to be freely lifted/lowered by a blower drive mechanism 69 composed of a chain, motor or the like, and further a blower fan 72 driven by a blower motor 71 is connected to the blower injecting body 24 through a pair of right and light accordion type hoses 70. Numeral 73U and 73D indicate upper and lower sensors for setting the lifting/lowering range of the blower injecting body 24.

Figure 13:
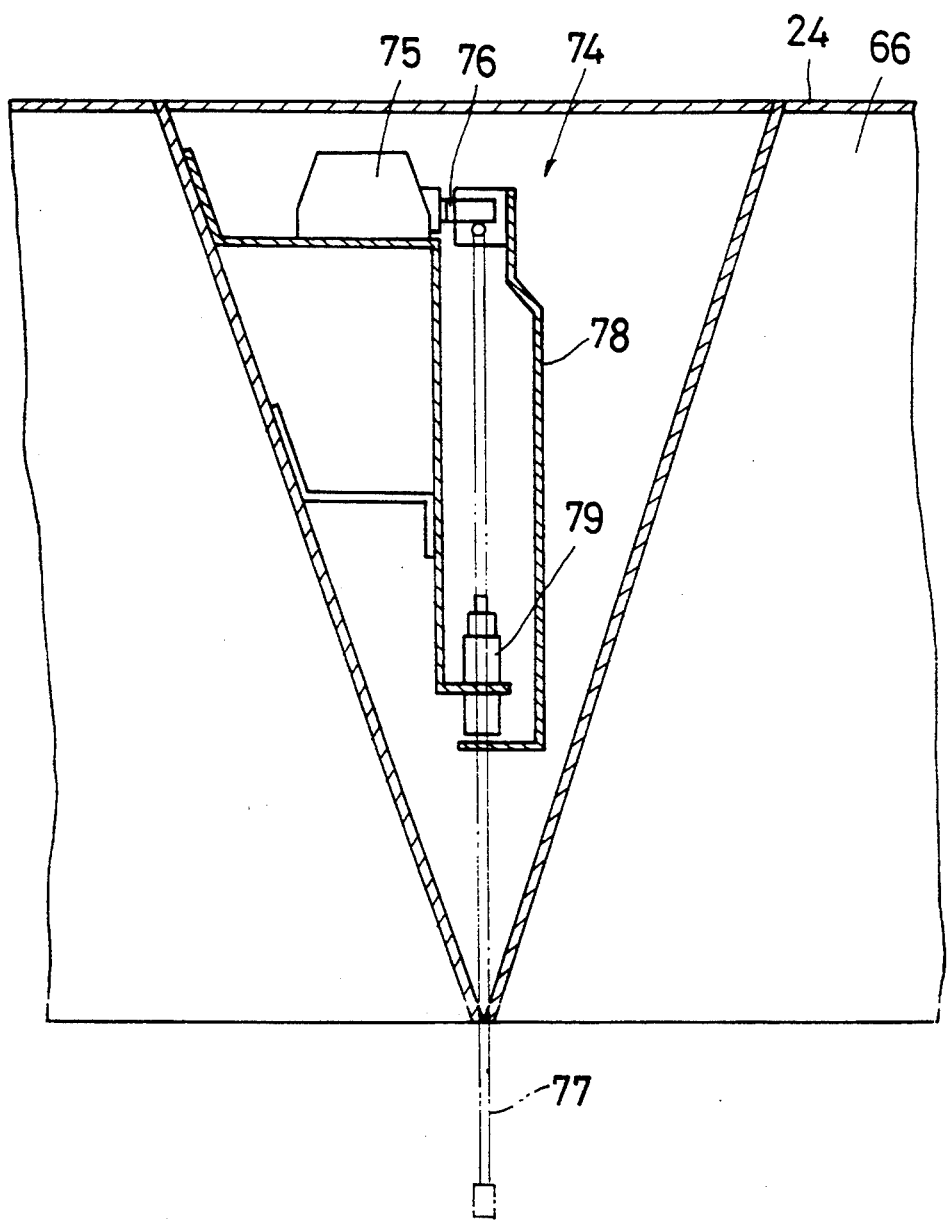
FIG. 13 is a sectional front view showing a blower collision preventive means.

A blower collision preventive means 74 is provided at the lateral center portion of the blower injecting body 24. As shown in FIG. 13, the blower collision preventive means 74 is so constructed that a hair contact piece 77 projecting in the longitudinal direction and an operating piece 78 are provided on a shaft 76 pivotally supported on a bearing body 75, and rotation of the operating piece 78 is detected by a proximity switch 79. The contact piece 78 is rocked by the contact with the vehicle body 2, to rotate the operating piece 78, so that the excessive approach of the blower injecting body 24 to the vehicle body 2 is detected to thereby stop the lowering of the blower injecting body 24 or the running of the portal frame 3.

The detection information from the blower collision preventive means 74 as an error detecting means is transmitted to the processing unit C of the computer 30, and is stored in the error memory unit L and simultaneously displayed on the existing error display unit M as an error.

The error detecting means include a device for detecting the washing position failure of the vehicle body 2 by the vehicle-type recognizing means 5, a device for detecting the operation failure of each drive mechanism, and a device for detecting the operation failure of the jetting pump, other than the drum collision preventive means 54 and the blower collision preventive means 74. The information of the action failures of the vehicle washing detected by the above devices is transmitted to the processing unit C of the computer 30, and is stored in the error memory unit L and simultaneously displayed on the existing error display unit as an error, and further, the previous errors before by several times can be displayed on a previous error display unit N. The existing error display unit M and the previous error display unit N are provided on the operating panel 21 mounted on the front surface of the portal frame 3.

Inverters are used for the drive equipments such as the above running mechanism 22, drum lifting/lowering mechanism 31, moving base drive mechanism 15, nozzle posture changing mechanism 51, blower drive mechanism 69 and the like, and a serve-driver is used for the nozzle lifting/lowering mechanism 59.

Next, the vehicle washing method in the automatic vehicle washing apparatus 1 shown in the above embodiment will be described with reference to FIGS. 8, 14 and 15.

The vehicle body 2 is stopped at a specified washing position with respect to the portal frame 3, and the operation panel 21 is operated to select either of a water washing-drying course, a detergent scattering-water washing (containing wax)-drying course, a detergent scattering-water washing (containing wax)-water washing-drying course, and the like. Thus, the start button is pushed to start the vehicle washing. At this time, the previous information stored in the memory unit A of the vehicle-type recognizing means 5 is reset.

As the portal frame 3 is moved forward to go along the rails 23 by the running mechanism 22, the photo-sensors 11 of the vehicle detecting means 4 disposed on the front surface of the portal frame 3 detect the vehicle body 2 from the end portion (front portion), and the change with time in the presence or absence of the vehicle body 2 is inputted in the memory unit A of the vehicle-type recognizing means 5 as the external information. Thus, the vehicle-type of the vehicle body 2 is recognized by the detection of the whole length of the vehicle body 2 during the movement of the portal frame 3.

After the vehicle detecting means 5 starts to recognize the vehicle-type of the vehicle body 2, the processing unit C of the vehicle-type recognizing means 5 reads out the information from the memory unit A on the basis of the set information of the set information unit B in which the set information on the washing is programmed, and supplies the output signal to the portal frame 3, lifting/lowering drum 6, moving base 7, side nozzles 9, the blower jetting means 10 and the like, to control them. When the vehicle body 2 is shifted from the specified vehicle stopping range in the longitudinal direction, the vehicle-type recognition by the vehicle detecting means 4 cannot be normally carried out, and an error is detected to stop the running of the portal frame 3.

In the selection of the detergent scattering-water washing (containing wax)-water washing-drying course, a detergent scattering step is performed in the first going operation of the portal frame 3; the water washing (containing wax) step is performed in the first returning operation; the water washing step is performed in the second going operation; and the drying step is performed in the second returning operation. In the above course, washing liquids are suitably selected for each step.

Figure 14:
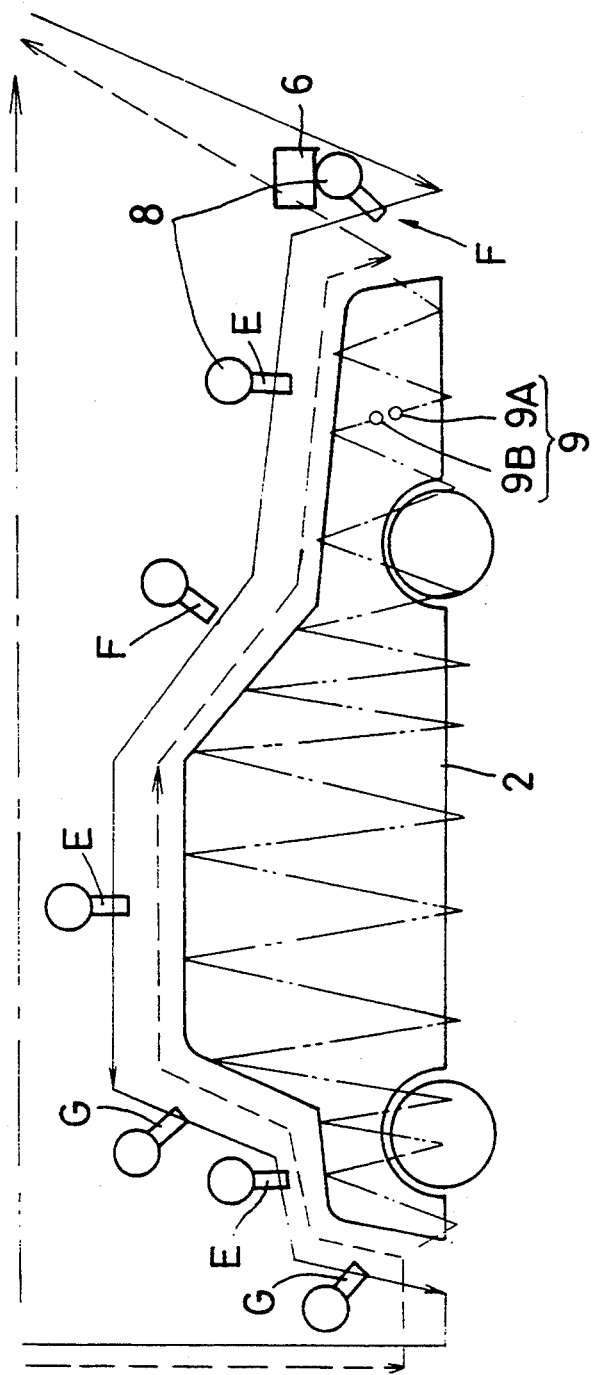
FIG. 14 is a view for explaining a vehicle washing action.
Figure 15:
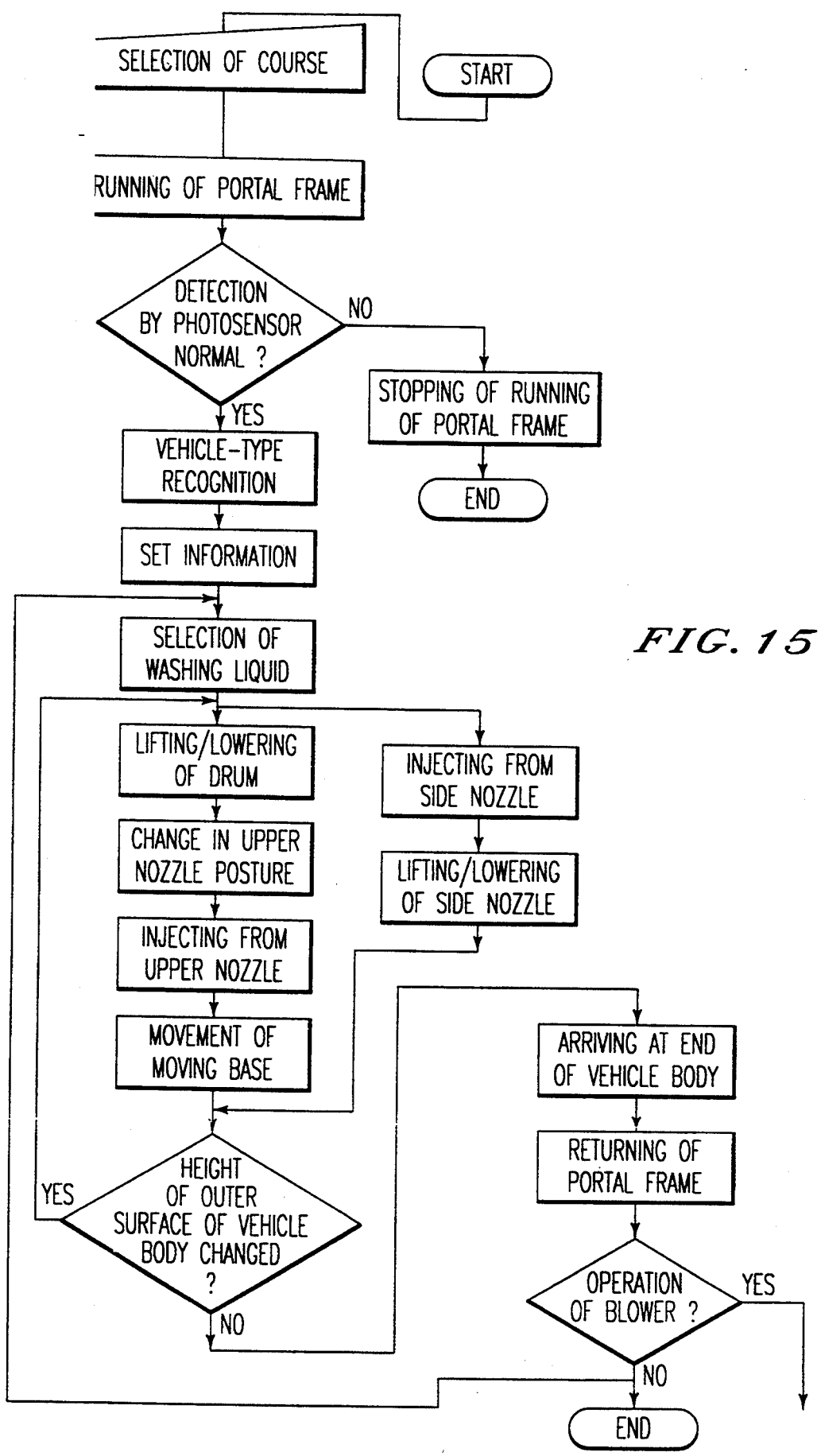
FIG. 15 is a flow chart showing a vehicle washing action.

As shown by the solid line of FIG. 14 the step of scattering a detergent on the upper portion of the vehicle body 2 is made by lowering the lifting/lowering drum 6 once for disposing the drum 6 at a position where it is separated from the vehicle body 2 with a specified interval, simultaneously allowing the upper nozzle 8 to taken in the forwardly and downwardly inclined posture to be opposed to the lower position of the end portion of the vehicle body 2 and scattering the detergent thereon in a spray state; and further, after completion of the scattering of the detergent on the front surface of the vehicle body 2, changing the posture of the upper nozzle 8 for sequentially scattering the detergent while lifting the lifting/lowering drum 6: in the down posture E for the upper surface of the bon-net; in the forwardly and downwardly inclined posture F for the front glass; downward posture E for the roof; in the rearwardly and downwardly inclined posture G for the rear glass; in the downward posture E for the trunk lid; and in the rearwardly and downwardly inclined posture G for the rear bumper. The step of scattering a detergent on the side portions of the vehicle body 2 is made substantially at the same time of the above step of scattering a detergent on the upper portion of the vehicle body 2. As shown by the two-dot chain line of FIG. 14, the side nozzles 9 fully scatter a detergent in a spray state on the side surfaces of the vehicle body 2 to be washed without any nonuniformity while being reciprocated to be lifted/lowered from the lower position. The height of the upper surface of the vehicle body 2 differs at each longitudinal position, that is, it is low at the bon-net, being high at the roof, and is intermediate at the portion of the glass surface. The moving speed of the side nozzles 9 is slow at the portion where the upper surface height of the vehicle body 2 is low, being high at the portion where the upper surface height is high, and is intermediate at the portion having the intermediate height; and the side nozzles 9 are reciprocated once for a substantially constant time.

In the above detergent scattering step, the contamination stuck on the surface of the vehicle body 2 is floated by spraying the detergent. Additionally, in the detergent scattering step for the upper portion of the vehicle body 2, since the detergent is sprayed, the nozzles are disposed to be separated from the vehicle body 2 more than in the washing step.

As shown by the chain line of FIG. 14, after the detergent scattering step is completed, the step of washing the upper portion of the vehicle body 2 is carried out while returning the portal frame 3. The lifting/lowering drum 6 is once lowered, and is disposed to be separated from the vehicle body 2 with a specified interval (at the position closer to the vehicle body 2 than in the detergent scattering step). At the same time, the upper nozzle 8 is taken in the rearwardly and downwardly inclined posture G to be opposed to the lower position of the end portion of the vehicle body 2, thus jetting water containing wax for fully spraying the jet with the high water pressure in the spatulate shape broadened in the longitudinal direction on the surface to be washed without any nonuniformity.

Like the detergent scattering step, water containing wax is jetted on the whole upper surface and the front-/rear surfaces of the vehicle body 2 while changing the posture of the upper nozzle 8, to cut-off the contaminated layer with the high pressure water including micro-particles of wax, and also to extend and join the wax content on the portion to be washed, thereby obtaining the brightness and the rust preventive effect.

The washing step for the side portions of the vehicle body 2 is carried out substantially at the same time of the washing step for the upper portion of the vehicle body 2. Water containing wax is jetted from the water nozzles 9B of the side nozzles 9. In this case, the moving speed of the side nozzles 9 is changed according to the height of the upper surface of the vehicle body 2, and the side nozzles 9 are reciprocated once for a substantially constant time.

Next, in the second going operation (solid line of FIG. 14) of the portal frame 3, the upper portion water washing step and the side portion washing step are carried out from the front side of the vehicle body 2. These upper portion water washing step and the side portion water washing step are substantially the same as those made in the first returning operation, except that the moving direction of the portal frame S is reversed, and water not containing wax is used. In these steps, the detergent and wax are cleaned with high pressure water, to finish the washing.

In each washing step, irrespective of the presence of projections such as a rear view mirror and an antenna, the washing is performed without the generation of the winding of brush and damage on the coated surface of the vehicle body. The water pressure is controlled by the computer. Moreover, in the upper portion washing step and the side portion washing step, when the width of the vehicle body is small, on the basis of the signal from the operation panel, the movement distance of the moving base 7 becomes a short distance interval J within the sensors 14; while when the width is large, it becomes the long distance interval K in which the moving base 7 is moved for a specified distance over the sensors 14.

The drying step is made as follows. After the rinsing is completed, the portal frame 3 is moved up to the rearmost end of the vehicle body 2 and stopped thereat, and the step is automatically switched into a blower step for drying. Thus, the upper blower jetting means 10A is operated such that the blower jetting body 24 is reciprocated to be lifted/lowered just as the upper nozzles 8 while passing through the dotted line orbit of FIG. 14, and jet wind from the upper portion of the vehicle body 2, to blow off the water drop on the vehicle body 2 for drying during the portal frame 3 is moved up to the original position. After the vehicle body 2 is dried up to the lower portion on the front surface thereof, the blower jetting body 24 is stopped, and lifted up to the uppermost portion and is stopped.

Additionally, in the selection of the water washing-drying course, the portal frame 3 is reciprocated one time; and in the selection of the detergent scattering-water washing (containing wax)-drying course, the portal frame 3 is returned without any work after the detergent scattering step is completed (shown by the chain line), and in the next one reciprocation, the water washing (containing wax) and the drying operations are carried out.

Figure 3:
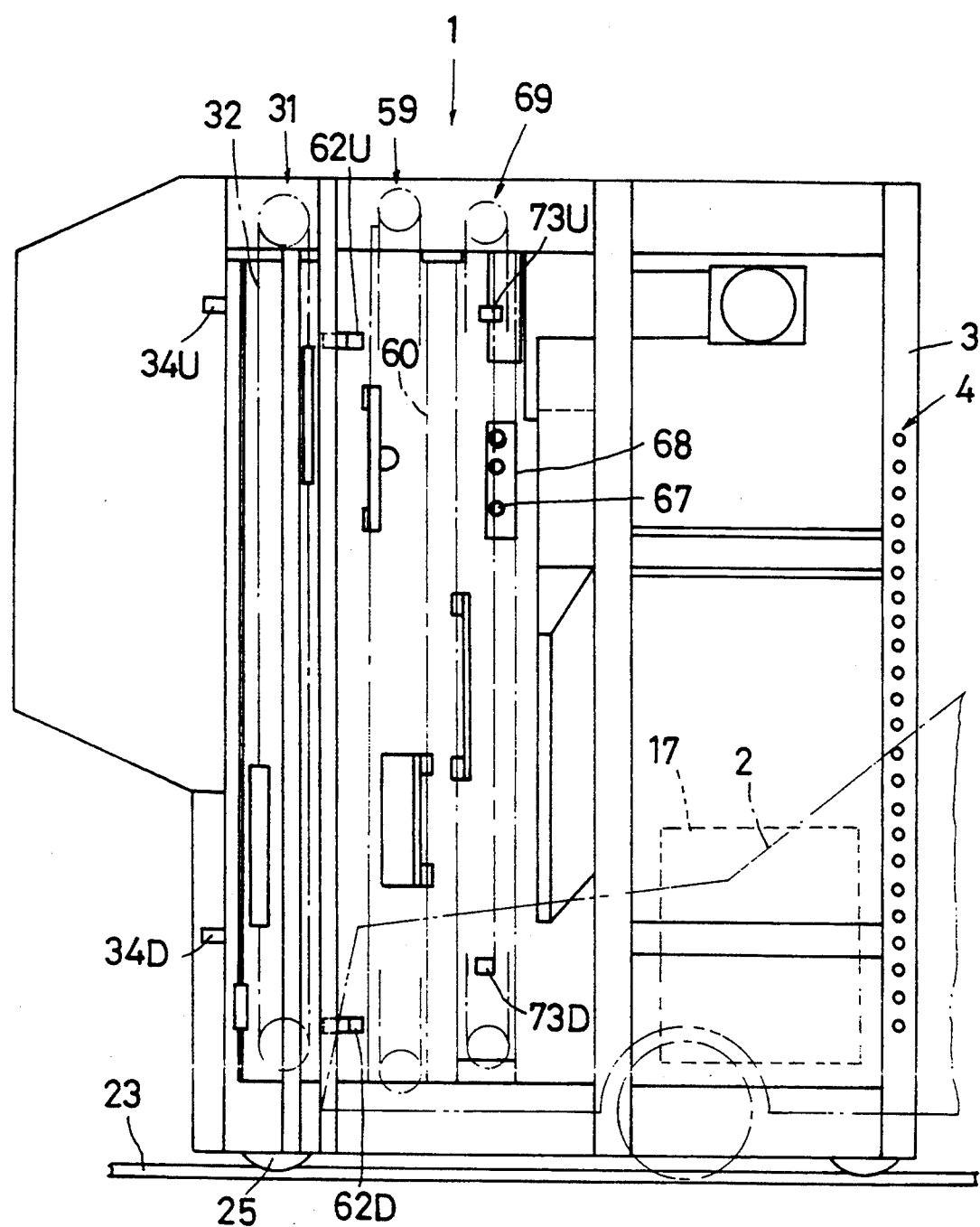
FIG. 3 is a sectional view taken along the line Y—Y of FIG. 1.
Figure 4:
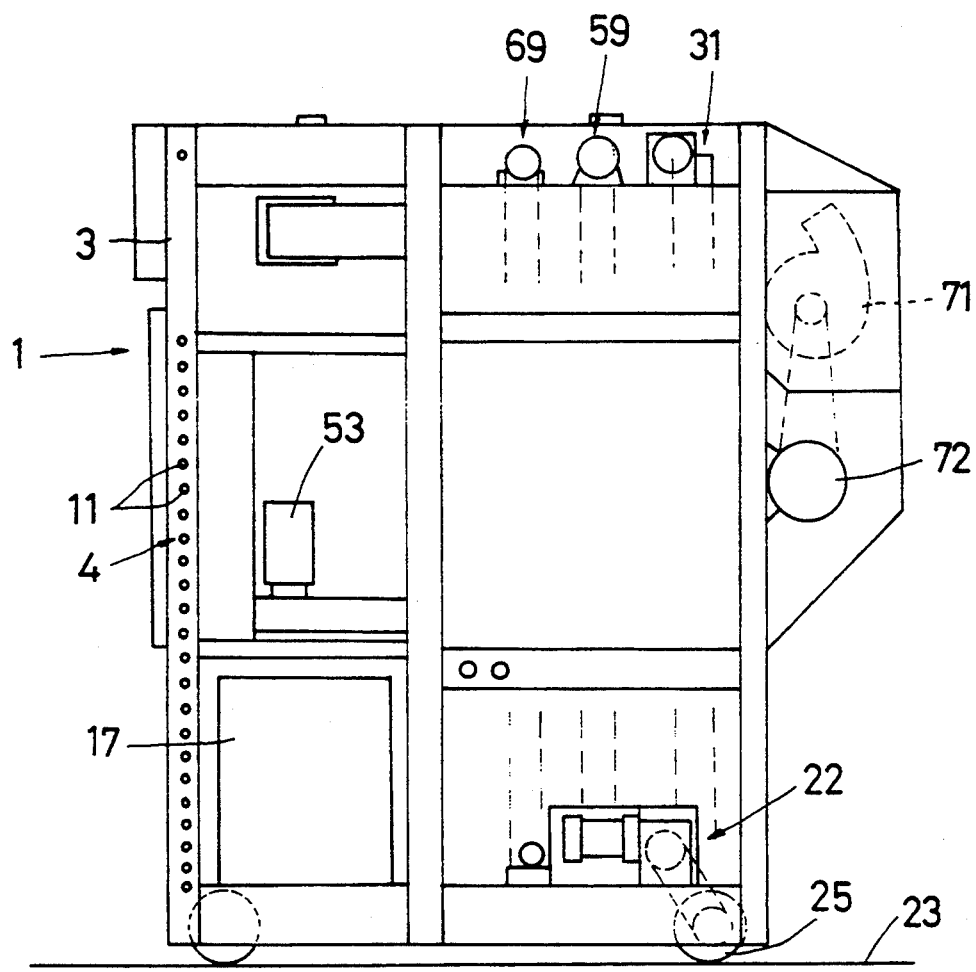
FIG. 4 is a right side sectional view of FIG. 1.
Figure 5:
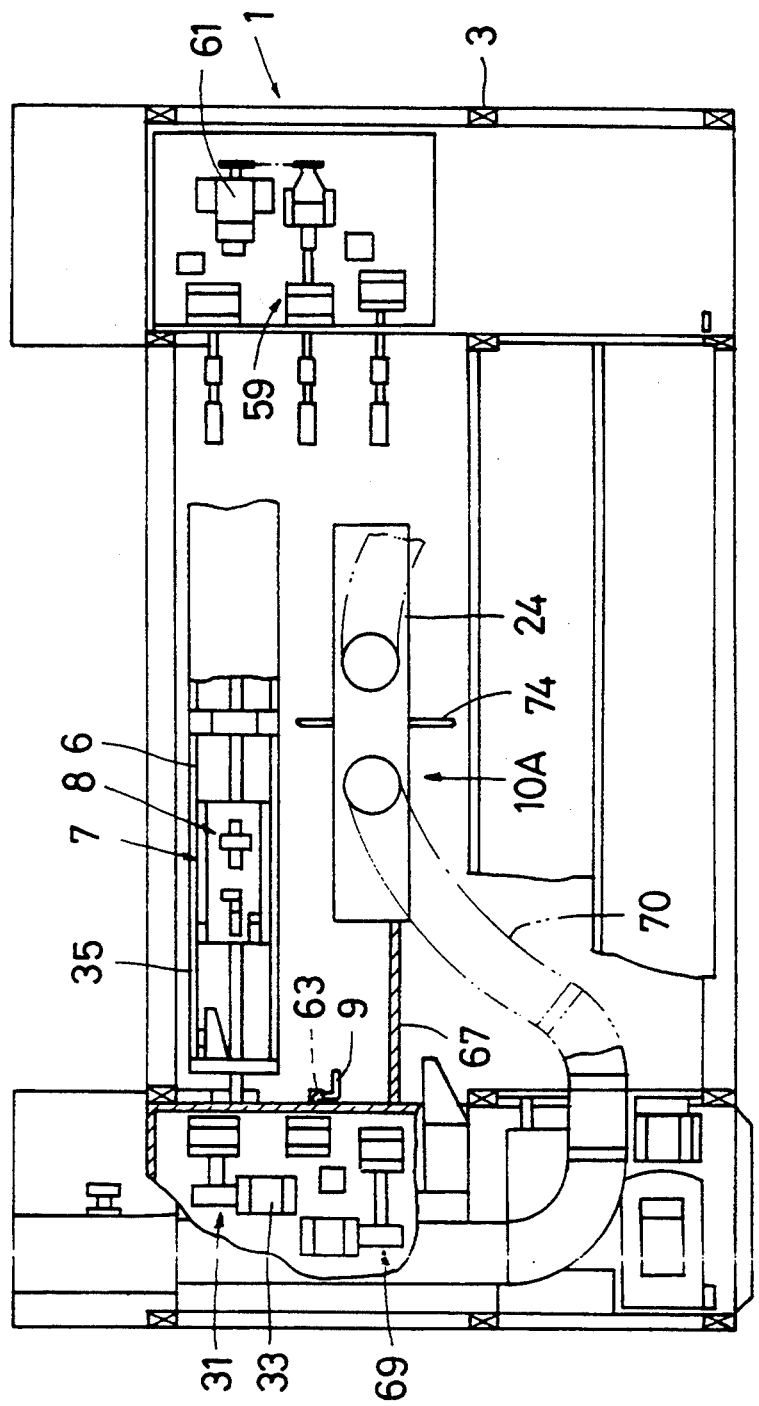
FIG. 5 is a plan view partially in cross section.

In each of the detergent scattering step, water washing (containing wax) step, water washing step and drying step when the drum collision preventive means 54, the blower collision preventive means 74 or the like is operated for any reason, an error is detected to stop the lifting/lowering of the lifting/lowering drum 6, the Punning of the portal frame 3 or the like, and further, as shown in FIG. 3, the information is inputted in the processing unit C and is displayed on the existing error display unit M. In addition, the previous errors before by several times may be outputted from the error memory unit L and displayed on the previous error display unit N.

In addition, the present invention is not limited to the above described embodiments, and various modification and design changes are possible.

What is claimed is:

1. A method of automatically washing vehicles comprising the steps of:

lifting/lowering a lifting/lowering drum mounted on a reciprocating portal frame to allow an upper nozzle to follow an outer surface of a vehicle body to be washed with a predetermined distance, while reciprocating the portal frame longitudinally of the vehicle body;

laterally moving said upper nozzle to inject a washing liquid therefrom;

lifting/lowering side nozzles to inject a washing liquid on side surfaces of said vehicle body therefrom;

detecting said vehicle body by a vehicle detecting means with a vertical length provided on a front portion of said portal frame in a first going operation of said portal frame;

storing information from said vehicle detecting means in time sequence to perform a comparative operation with previously set information; and controlling the movement of said portal frame, said lifting/lowering of said lifting/lowering drum, the lateral movement of said upper nozzle and said lifting/lowering of said side nozzles according to each portion of said vehicle body;

wherein said side nozzles are lifted/lowered according to a height of a portion to be washed of said vehicle body which is obtained by the information from said vehicle detecting means, said side nozzles being lifted/lowered at a high speed when said portion is high, and being lifted/lowered at a low speed when said portion is low.

2. The method as defined in claim 1, wherein said vehicle detecting means comprises a plurality of photo-sensors arranged in a vertical direction so as to detect a change in a presence or absence of said vehicle body with time.

3. An apparatus for automatically washing vehicles comprising:

a portal frame being movable relative to a vehicle body to be washed;

a vehicle detecting means provided on said portal frame for detecting an outer surface of said vehicle body;

a lifting/lowering drum provided on said portal frame so as to be vertically movable;

a moving base provided on said lifting/lowering drum through a moving base drive mechanism so as to be laterally movable;

an upper nozzle for washing which is provided on said moving base;

a pair of side nozzles for washing which are respectively provided on both side portions of said portal frame so as to be vertically movable;

wherein said vehicle detecting means has a plurality of photo-sensors vertically arranged;

a vehicle-type recognizing means including a memory unit for storing information from said photo-sensors in time sequence, a set information unit in which set information on vehicle washing is programmed, and a processing unit for reading-out said information from said memory unit on the basis of said set information of said set information unit thereby supplying a control signal to each drive mechanism of said portal frame, lifting/lowering drum, moving base, upper nozzle and side nozzles; and a side nozzle lifting/lowering mechanism for lifting/lowering said side nozzle by changing a speed thereof according to a height of a portion to be washed of said vehicle body which is obtained by a detection signal from said vehicle detecting means.

4. The apparatus as defined in claim 3, wherein said portal frame has an error detecting means for detecting an operation failure of vehicle washing and transmitting detected information to said processing unit of said vehicle-type recognizing means, said vehicle type recognizing means has an error memory unit for storing an error transmitted to said processing unit thereof, and said error memory unit is connected to an existing error display unit and a previous error display unit of an operation panel provided on said portal frame.

5. The apparatus as defined in claim 3, wherein each of said side nozzles has a detergent nozzle and a water nozzle.

6. The apparatus as defined in claim 3, wherein said moving base has a collision preventive means for detecting said moving base when-said moving base approaches to said vehicle body with a predetermined distance.

7. The apparatus as defined in claim 6, wherein said collision preventive means has a first sensor for detecting an excessive approach of said moving base to said vehicle body in a longitudinal direction of said vehicle body, and a second sensor for detecting an excessive approach of said moving base to said vehicle body in a vertical direction.

8. The apparatus as defined in claim 3, wherein said moving base drive mechanism has sensors for detecting said moving base on both side portions of said lifting/lowering drum, and said moving base is operable according to either a first mode to be reversed when said sensors are operated or a second mode to be reversed after an elapse of a set-up time since an operation of said sensors.

9. The apparatus as defined in claim 3, wherein said upper nozzle has an injecting fixture projecting downwardly of a main body, said main body is rotatably supported on said moving base so as to be rotatable about a lateral axis thereof, and said moving base is provided with a nozzle posture changing mechanism for changing a posture of said injecting fixture into a downward posture, a forwardly downwardly inclined posture and a rearwardly downwardly inclined posture by rotation of said main body.

10. An apparatus for automatically washing vehicles comprising:

a portal frame being movable relative to a vehicle body to be washed;

a vehicle detecting means provided on said portal frame for detecting an outer surface of said vehicle body;

a lifting/lowering drum provided on said portal frame so as to be vertically movable;

a moving base provided on said lifting/lowering drum through a moving base drive mechanism so as to be laterally movable;

an upper nozzle for washing which is provided on said moving base;

a pair of side nozzles for washing which are respectively provided on both side portions of said portal frame so as to be vertically movable;

wherein said vehicle detecting means has a plurality of photo-sensors vertically arranged;

a vehicle-type recognizing means including a memory unit for storing information from said photo-sensors in time sequence, a set information unit in which set information on vehicle washing is programmed, and a processing unit for reading-out said information from said memory unit on the basis of said set information of said set information unit thereby supplying a control signal to each drive mechanism of said portal frame, lifting/lowering drum, moving base, upper nozzle and side nozzles; and a nozzle lifting/lowering mechanism for lifting/lowering said side nozzles by changing a speed thereof according to a height of a portion to be washed of said vehicle body which is obtained by a detection signal from said vehicle detecting means;

wherein said moving base drive mechanism has sensors for setting a movement range of said moving base into longer and shorter modes on both side portions of said lifting/lowering drum, and said upper nozzle has an injecting fixture capable of being changed in posture into a downward posture, a forwardly downwardly inclined posture and a rearwardly downwardly inclined posture.

11. The apparatus as defined in claim or 3, or 10, wherein a detergent tank, a water tank and a water injecting pump for said upper nozzle and side nozzles are provided within one of both side portions of said portal frame, and doors for maintenance are provided on an inner surface of side portions of said portal frame.

12. The apparatus as defined in claim 3 or 10, wherein said portal frame includes a blower injecting means for drying said vehicle body, and said blower injecting means has an upper blower injecting means for injecting wind on an upper surface of said vehicle body and a pair of lateral blower injecting means for injecting wind on both side surfaces of said vehicle body.

13. A method of automatically washing vehicles comprising the steps of:

transporting a vehicle body to be washed to a predetermined position with respect to a portal frame and stopping the vehicle body at the predetermined position;

moving the portal frame so as to bridge over the vehicle body;

detecting the vehicle body with use of vehicle detecting means vertically elongated and provided on a front portion of the portal frame as the portal frame is moved so as to accumulate in time sequence information for controlling the movement of the portal frame, a lifting/lowering of a lifting/lowering drum provided on the portal frame, a lateral movement of an upper nozzle provided to the lifting/lowering drum and a lifting/lowering of side nozzles; and causing the upper nozzle to follow an outer surface of the vehicle body with a predetermined distance while lifting/lowering the lifting/lowering drum at a position spaced by a constant distance from the vehicle detecting means rearwardly in the moving direction of the portal frame, causing the upper nozzle to laterally move and inject a washing liquid, and lifting/lowering the side nozzles in accordance with a height of a portion to be washed of the vehicle body to inject a washing liquid during the movement of the portal frame, by controlling on a basis of the information accumulated.

* * * * *